United States Patent
Nakane

(10) Patent No.: US 9,824,305 B2
(45) Date of Patent: Nov. 21, 2017

(54) PRINTING CONTROL DEVICE, IMAGE PROCESSING METHOD, AND STORAGE MEDIUM

(71) Applicant: CANON KABUSHIKI KAISHA, Tokyo (JP)

(72) Inventor: Hiroyuki Nakane, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/078,260

(22) Filed: Mar. 23, 2016

(65) Prior Publication Data
US 2016/0292547 A1 Oct. 6, 2016

(30) Foreign Application Priority Data

Mar. 31, 2015 (JP) ................. 2015-072844

(51) Int. Cl.
G06F 3/12 (2006.01)
G06K 15/02 (2006.01)
G06K 15/00 (2006.01)

(52) U.S. Cl.
CPC ..... *G06K 15/1849* (2013.01); *G06K 15/1868* (2013.01); *G06K 15/181* (2013.01); *G06K 15/1836* (2013.01)

(58) Field of Classification Search
None
See application file for complete search history.

(56) References Cited

U.S. PATENT DOCUMENTS

| 6,166,822 A * | 12/2000 | Harrington, III | G06K 15/02 |
|---|---|---|---|
| | | | 358/1.13 |
| 8,724,172 B2 | 5/2014 | Matsui | |
| 2013/0044336 A1* | 2/2013 | Matsui | G06K 15/1822 |
| | | | 358/1.9 |

FOREIGN PATENT DOCUMENTS

JP 2013-042458 A 2/2013

* cited by examiner

*Primary Examiner* — Dov Popovici
(74) *Attorney, Agent, or Firm* — Fitzpatrick, Cella, Harper & Scinto

(57) ABSTRACT

An image processing apparatus performing a rasterization process with a scanline method interprets a received printing job and generates objects. In an objecting combining process, the reception objects are spooled, the generated objects are interpreted, and it is subsequently determined whether or not the objects are vertically long objects to be combined into a single object. If the objects are determined to be the vertically long objects, an object combining process is performed to render the vertically long objects respectively in a longitudinal direction to form the single object.

10 Claims, 13 Drawing Sheets

PRINTING CONTROL DEVICE, IMAGE PROCESSING METHOD, AND STORAGE MEDIUM

BACKGROUND OF THE INVENTION

Field of the Invention

The present invention relates to a technology for a rendering process in accordance with a scanline method.

Description of the Related Art

In the related art, as a method of rendering bitmap images from printing jobs, there a scanline method. In the scanline method, objects included in printing jobs described in page description languages (PDLs) are generally interpreted to generate display lists (DLs) which are intermediate data. Then, rendering processes are performed on the objects included in the generated DLs using units of scanlines extending in a main scanning direction (horizontal direction). In the scanlines, since the rendering process is performed on each object, the rendering process is slow in a printing job in which many objects are present on the same scan line in some cases. Accordingly, there are technologies for speeding up rendering processes by combining N objects into M objects (where M<N) in DL generation stages to reduce the number of objects on the same scan lines.

In the device disclosed in Japanese Patent Laid-Open No. 2013-42458, a rendering method (a painter's method or a scanline method) is changed according to a classification of combining target objects, a method of overlapping objects, and the number of objects to be combined. Depending on an application, a redundant rendering instruction such as an instruction to split one line into a plurality of overlapping objects for expression is given. In particular, if many fine objects are rendered using the scanline method, considerable loads are applied to processes for information (an edge or a level) on each object. By changing the rendering method according to the classification of combining target objects, a method of overlapping objects, and the number of objects to be combined, the objects to be combined can be rendered by the optimum method. In this way, it was possible to speed up rendering of bitmap images.

However, in the technology of Japanese Patent Laid-Open No. 2013-42458, the following phenomenon occurs if objects with vertically sliced shapes are combined. The objects with the vertically sliced shapes (hereinafter referred to as vertically sliced objects) are small pieces of objects which are separated in rendered objects according to an application or the like and are vertically elongated slender objects of which heights are greater than widths.

FIGS. 7A to 7D illustrate an example in which vertically sliced objects are generated. In FIGS. 7A to 7D below, the horizontal direction (transverse direction) corresponds to the main scanning direction in which an image is formed by a printing device and the vertical direction (longitudinal direction) corresponds to the sub-scanning direction (sheet transport direction). The main scanning direction of the printing device is the same as the scanline direction in rendering in accordance with a scanline method of the printing device. It is assumed that application data 700 in which the direction of an image illustrated in FIG. 7A that is a portrait (longitudinal orientation) is generated in accordance with an application of a host machine, and subsequently a printing process is performed. The entire surface of a page is imaged as application data 710 in FIG. 7B by an application, a process of splitting the surface of the page in the horizontal direction in units of one line, and data is sent to a printer driver. At this time, if a device which is an output destination of the data is a printing device for transverse transport, the printer driver rotates the entire page, converts the direction of the data as in a printing job 720 in FIGS. 7C and 7D into a landscape (transverse orientation), and sends the data to the printing device. In the printing job 720, many vertically sliced objects in which "width<<height" is set are generated through this conversion, as illustrated in objects 721 in FIG. 7D.

In the technology of Japanese Patent Laid-Open No. 2013-42458, there is no configuration in which it is determined whether or not objects are vertically sliced objects and a rendering algorithm at the time of combining the objects is the above-described scanline method. In this case, in the printing job 720 in FIGS. 7C and 7D, data is interpreted in the horizontal direction (width direction) indicated by an arrow 722 of FIG. 7D. Therefore, to handle a large number of edges proportional to the number of objects, calculation complexity becomes considerable.

SUMMARY OF THE INVENTION

The present invention is devised to speed up a rendering speed of rendering.

According to an embodiment of the present invention, an information processing system is provided that includes a document generation unit configured to generate a document page by overlay outputting form information and field data of a document; an acquisition unit configured to acquire attribute information indicating a field attribute of the document; a conversion unit configured to convert the document page into an editable document page; and a browsing screen generation unit configured to generate data for displaying a browsing screen for browsing and editing the editable document page including at least the attribute information and the converted document page.

According to the aspect of the present invention, it is possible to speed up the rendering speed of rendering.

Further features of the invention will become apparent from the following description of exemplary embodiments with reference to the attached drawings.

DESCRIPTION OF THE PRESENT EMBODIMENTS

Hereinafter, a printing control device serving as an image processing apparatus according to an embodiment of the present invention will be described with reference to the drawings.

Figure 1:
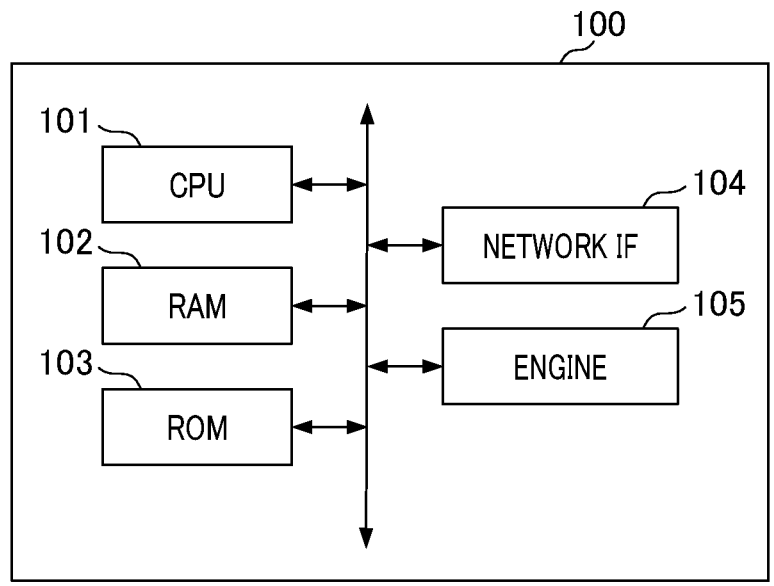
FIG. 1 is a diagram illustrating an example of a hardware configuration of a device according to an embodiment of the present invention.

FIG. 1 is a block diagram illustrating an example of a hardware configuration of a printing control device 100 according to the present embodiment. A central processing unit (CPU) 101 is a general control unit of the printing control device 100, and interprets and executes software 200 (see FIG. 2) of the printing control device 100 to be described below. A random access memory (RAM) 102 is a storage device which is accessible by the CPU 101. The RAM 102 is used as a reservation destination of a memory necessary for an operation of the software 200. In a read-only memory (ROM) 103, a program of the software 200 is stored and the program is read to be executed by the CPU 101. A network IF unit 104 is an interface unit that is connected to an external device (a personal computer, another printing control device, or the like) via a network to mainly receive printing data. It should be noted that printing data will be described below as page description language (PDL) data. An engine 105 is a printing engine that performs a printing process on a printing sheet in accordance with the PDL data interpreted by the CPU 101. In the present embodiment, an example in which a printing process is performed in an external device via a network will be described. However, even if the PDL data is stored in the RAM 102 rather than in the external device, the same advantages may be obtained by reading the data from the RAM 102.

Figure 2:
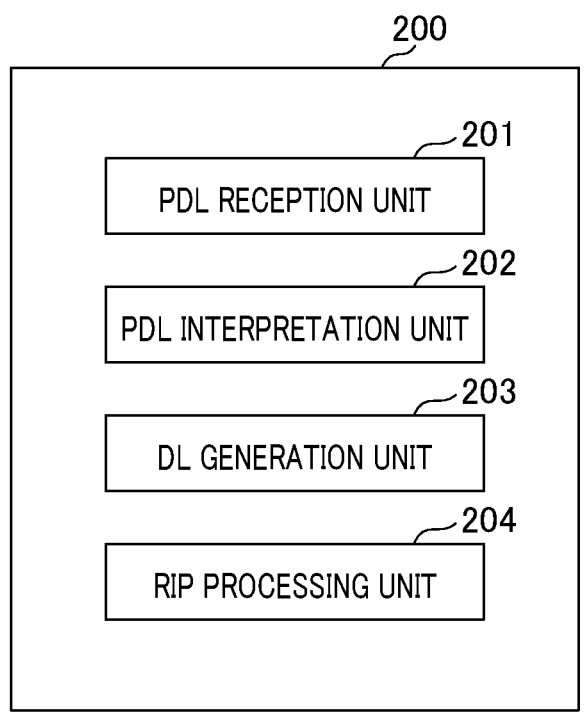
FIG. 2 is a diagram illustrating an example of a software module configuration of the device according to the present embodiment of the present invention.

FIG. 2 is a diagram illustrating an example of a software configuration of the printing control device 100. The software 200 of the printing control device 100 is configured to include four software modules which all operate on the CPU 101. A PDL reception unit 201 is a module that receives the PDL data from the network IF unit 104. The received PDL data is stored in the RAM 102. A PDL interpretation unit 202 is a module that reads and interprets a rendering command designated in the PDL data stored in the RAM 102. Shape or color information of an object which is a rendering target is decided according to the rendering command, and the object is generated. An example of a configuration of an object will be described with reference to FIG. 4.

Figure 4:
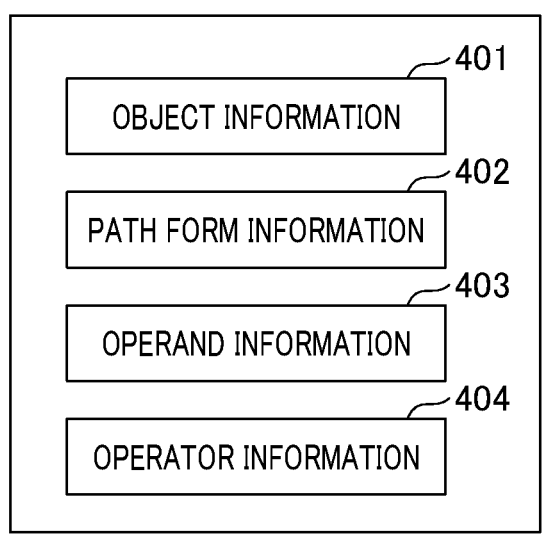
FIG. 4 is a diagram illustrating an example of a configuration of an object according to the present embodiment.

FIG. 4 illustrates an example of a configuration of a generated object. Object information 401 is information that indicates an attribute of an object regarding whether the object is, for example, an image object or a graphic object. Path shape information 402 is information regarding the position or an outline of the object, such as rendering range information of the object or path point sequence information expressing the outline of the object with a point sequence. Operand information 403 is information regarding rendering, such as operand classification (Image, Flat Fill, and the like) of the object, color information, or a color space (RGB, Gray, or the like). Operator information 404 is information related to a hierarchy of the object.

A display list (DL) generation unit 203 in FIG. 2 is a module that generates a DL which is intermediate data of the object. Sub-modules of the DL generation unit 203 will be described below with reference to FIG. 3. A raster image processor (RIP) processing unit 204 is a module that performs rasterization based on the DL generated by the DL generation unit 203. A structure of the DL will be described below with reference to FIG. 10.

Figure 3:
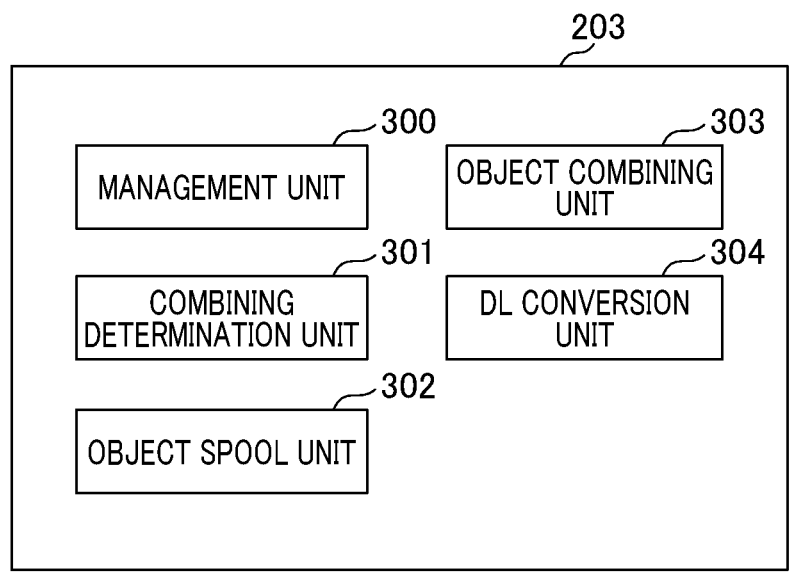
FIG. 3 is a diagram illustrating an example of sub-modules of a display list (DL) generation unit module in FIG. 2.

FIG. 3 is a diagram illustrating an example of a software configuration of sub-modules included in the DL generation unit 203 in FIG. 2. A management unit 300 is a sub-module that transmits and receives information to and from other sub-modules according to control. A combining determination unit 301 is a sub-module that determines whether or not a received object can be combined or determines an optimum combining format from information regarding the received objects and spooled objects. A general example of a combining format is normal image combining. The normal image combining refers to a combining format by which all objects are rendered and output as images. A vertically sliced object combining is determined under management of the management unit 300 (sub-module), as will be described below. Other combining formats are path combining in which Flat Fills are combined and the like, but there is no direct relation with the gist of the present invention, and thus the description thereof will be omitted.

An object spool unit 302 is a sub-module that spools the received objects. The spooled objects are stored in the RAM 102. An object combining unit 303 is a sub-module that combines the objects spooled by the object spool unit 302. A DL conversion unit 304 is a sub-module that converts an object into a DL.

Figure 5:
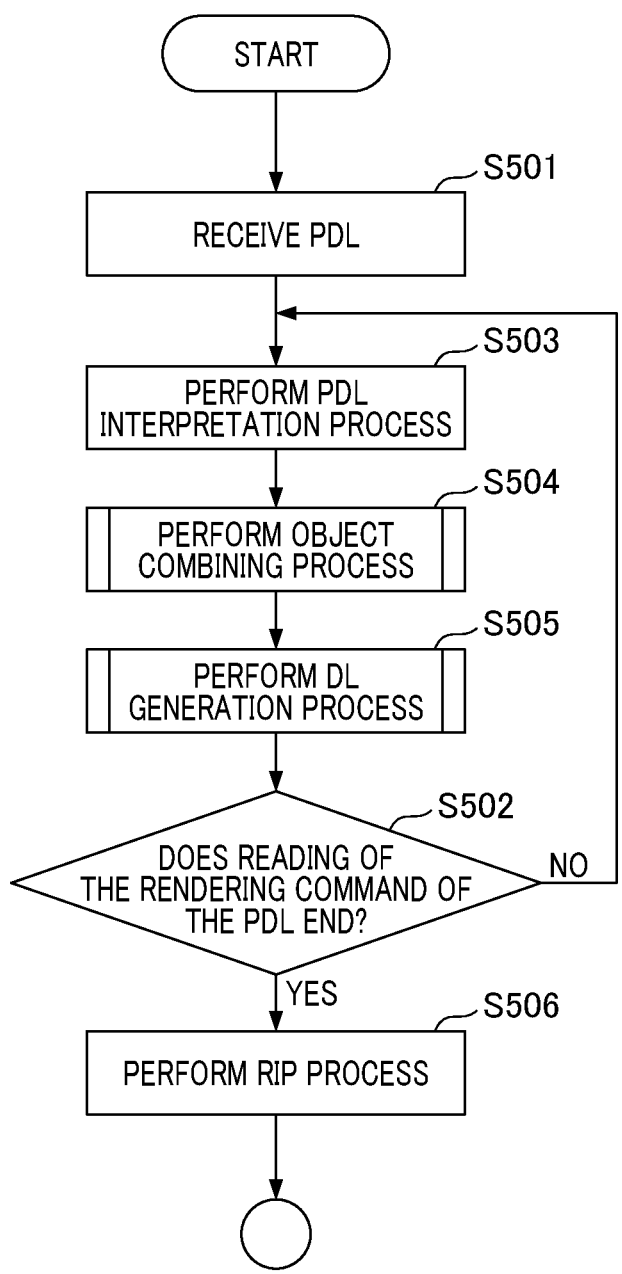
FIG. 5 is a flowchart illustrating an example of printing control according to the present embodiment.

Next, an example of a process of the software 200 of the printing control device 100 will be described with reference to FIG. 5. FIG. 5 is a flowchart illustrating the example of the process of the software 200. Processes illustrated in the following flowchart are realized if the CPU 101 executes programs stored in the ROM 103.

In S501, the PDL reception unit 201 receives a PDL command from the network IF unit 104 and stores the PDL command in the RAM 102. Processes from S503 to S505 are repeatedly performed until reading of the rendering command of the PDL received in S501 ends. In S503, the PDL interpretation unit 202 reads and interprets the rendering command of the stored PDL to generate objects. In S504, the DL generation unit 203 attempts to combine objects generated in S503. The details of this process will be described below with reference to FIG. 6. The objects which are not combined in S504 are passed to the process of S505 without change.

In S505, the DL generation unit 203 generates a DL from the objects passed after the process of S504. Details of the DL generation process will be described below with reference to FIG. 9. In S502, if the reading of the rendering command of the PDL ends, the process proceeds to S506. If the reading of the rendering command of the PDL does not end, the process returns to S503. In S506, the RIP processing unit 204 rasterizes a page based on the DL generated in the processes from S502 to S505 with a scanline method. A rasterization method will be described below with reference to FIG. 12. The engine 105 prints an image on a printing sheet according to image data of each page after the rasterization.

Details of the object combining process of S504 illustrated in FIG. 5 will be described with reference to the flowchart of FIG. 6. An example of a process in FIG. 7 will be described together. In a printing job 720 illustrated in FIGS. 7A to 7D, a sheet size is A4 and a resolution is 600 dpi (dots per inch), and interpretation is performed in S503 of FIG. 5 to generate objects. Vertically long objects 721 illustrated in FIG. 7D are one of the objects. A width direction of the object is indicated by an arrow 722. A direction of the arrow 722 is a main scanning direction (that is, a scanline direction (horizontal direction) in a general scanline method) perpendicular to a sub-scanning direction (a transport direction (vertical direction) of a printing sheet). The objects 721 have widths of one pixel and are an image object with a height H (=4961). The printing job 720 illustrated in FIGS. 7C and 7D is rectangular data in which N (=7061) objects 721 are arranged side by side without gaps, and is in a state in which M objects 721 are spooled at the current time point (where "0<M<N").

In S601 of FIG. 6, the combining determination unit 301 determines whether or not the received objects (hereinafter referred to as reception objects) are combinable objects. For the combinable objects, in the present embodiment, operand information is one of the Flat Fill, the image, and a glyph, and the objects having a rectangle or a scanline shape with path point sequence information are set as target objects. A factor determined herein is a factor regarding whether or not the reception objects can be combined. Whether or not the objects are actually combined is decided in a subsequent process. In the case of the objects 721 in FIG. 7B, it is determined that the objects 721 can be combined since the operand information is the image and the path point sequence information is the rectangle.

In S602, the object spool unit 302 spools the reception objects. The spooled objects are stored in the RAM 102. The objects spooled in S602 are stored in a region distinguished from the already spooled objects (spooled objects). In S603 the reception objects are determined to be spooled and are subsequently assumed to be stored in the same region. This is because if the objects spooled in S603 are combined and determined to be combined, these objects are prevented from being combined with the spooled objects at the same time.

Figure 8:
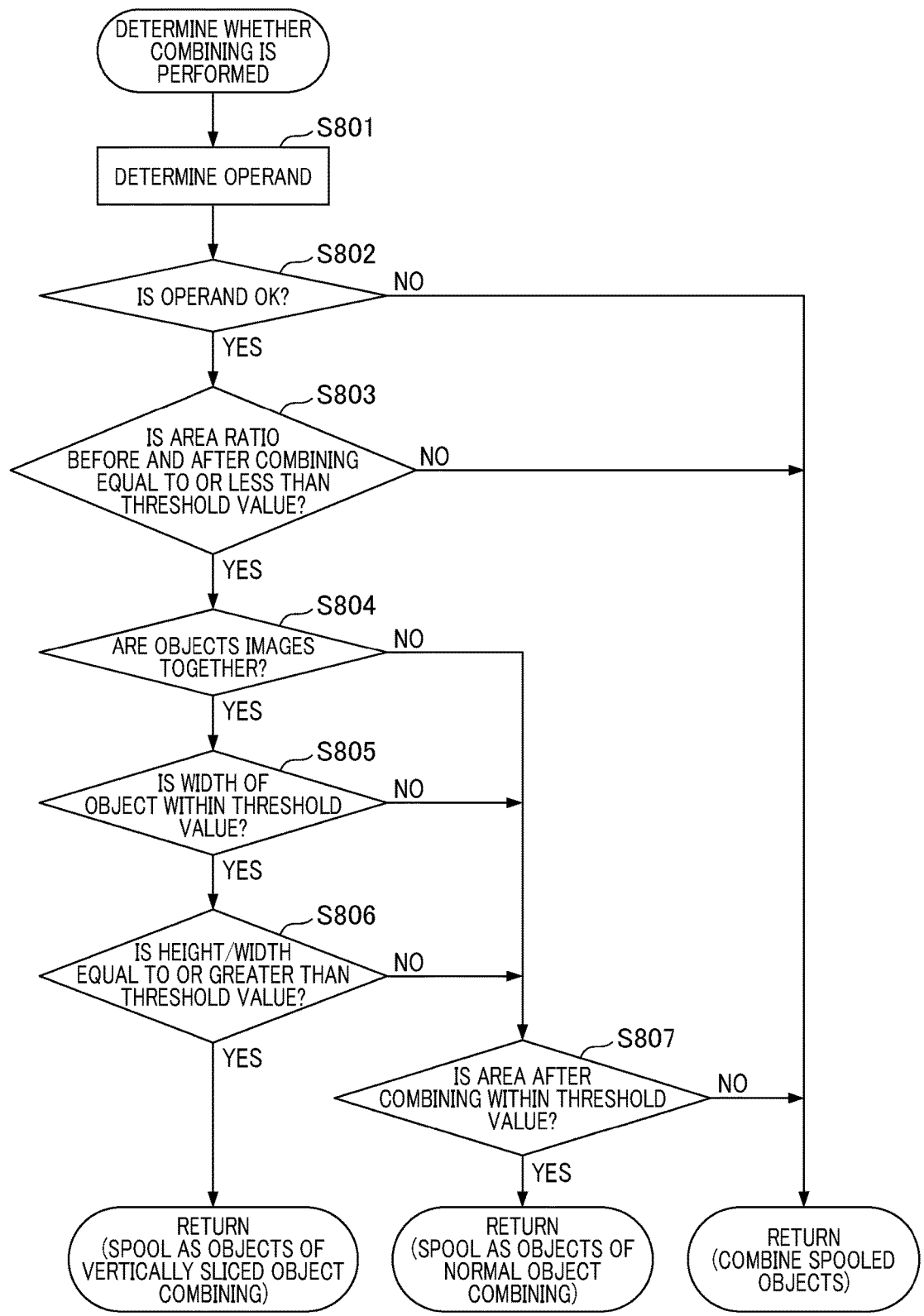
FIG. 8 is a flowchart illustrating processes of performing the combining and determining the combining according to the present embodiment.

In S603, based on information regarding the reception objects, the combining determination unit 301 determines whether or not these objects and the spooled objects can be combined with the same combining method. If the objects can be combined with the same combining method, the reception objects are stored in the same region as the spooled objects. Conversely, if the objects are combined with different combining methods, only the spooled objects are combined and the reception objects are stored as spooled objects. This process will be described with reference to FIG. 8.

In S801, the combining determination unit 301 compares operand information regarding the reception objects and operand information regarding the spooled objects. A list of comparison results is shown in Table 1.

TABLE 1

|  | Image | FlatFill | Glyph |
|---|---|---|---|
| Image | OK | OK | NG |
| FlatFill | OK | OK | NG |
| Glyph | NG | NG | OK |

In Table 1, the top row is set as the operand information regarding the reception objects and the left-most column is set as the operand information regarding the spooled objects. "OK" means that combining is possible and "NG" means that combining is not possible. If the operand information is the same between both of the objects, the comparison result is OK. Even if the operand information differs between both of the objects and one of the pieces of operand operation is an image and the other operand operation is a flat fill, the comparison result is OK. The reason why the comparison result is OK even if the operands are not the same between both of the objects is that if objects overlap densely in a given region, path tracing is faster by non-necessity in image combining than path combining in many cases. For the objects 721 in FIG. 7D, since the operand information is an image and the operand information regarding the spooled objects is an image, the comparison result is determined to be OK.

If the combining determination unit 301 determines that the comparison result of S801 is OK in S802, the process proceeds to S803. If the combining determination unit 301 determines that the comparison result is NG, the combining determination unit 301 determines that the reception objects are not combined with the spooled objects, and only the spooled objects start to be combined. Then, the process proceeds to S604 of FIG. 6.

In S803, the combining determination unit 301 calculates a ratio of an area at the time of combining the spooled objects to an area at the time of combining the reception objects and the spooled objects and compares the ratio to a predetermined threshold value to determine whether or not the area ratio is equal to or less than the threshold value. If the area ratio is determined to be equal to or less than the threshold value in the determination result, the process proceeds to S804. If the area ratio is determined to exceed the threshold value, the combining determination unit 301 determines that the reception objects and the spooled objects are not combined and only the spooled objects start to be combined. Then, the process proceeds to S604 of FIG. 6. For example, a case in which a threshold value used for the comparison in S803 is set to 2.1 is assumed. In the objects 721 of FIG. 7D, the objects are arranged without gaps. Therefore, a determination condition that the area ratio before and after combining is less than the threshold value is satisfied ("M≥1") as follows:

(an area before combining)=$1*H*M$;

(an area after combining)=$1*H*M+1*H$; and (an area ratio before and after combining)= $(1*H*M+1*H)/(1*H*M)=1+1/M<2.1$.

S804 to S806 are processes of determining whether or not the reception objects can be combined as vertically sliced objects. In S804, the combining determination unit 301 determines whether or not the pieces of operand information of the reception objects and the spooled objects are images together. If the pieces of operand information of both of the objects are images together, the process proceeds to S805. Otherwise, the process proceeds to S807.

In S805, the combining determination unit 301 compares the width of the reception object to a predetermined threshold value to determine whether or not the width is within the threshold value. If the width is within the threshold value in the determination result, the process proceeds to S806. If the width is not within the threshold value, the process proceeds to S807. For example, if the threshold value used for the comparison of S805 is assumed to be 1, the width of the object 721 in FIG. 7D is 1, and therefore the determination condition is satisfied.

In S806, the combining determination unit 301 compares a ratio of the height to the width (height/width) of the reception object to a predetermined threshold value to determine whether or not the ratio is equal to or greater than the threshold value. If the ratio is equal to or greater than the threshold value, the combining determination unit 301 determines that the reception objects are objects which can be combined as vertically sliced objects with the spooled objects, and then the process proceeds to S604 of FIG. 6. If the ratio is less than the threshold value, the process proceeds to S807. For example, a case in which the threshold value used for the comparison of S806 is set to 100 is assumed. In the objects 721 in FIG. 7D, the widths of the objects are 1 and the height is H (=4961), and the ratio of the height to the width (height/width) is "H>100." Therefore, the determination condition is satisfied. Accordingly, the objects are determined to be the objects which can be combined as vertically sliced objects.

In S807, the combining determination unit 301 compares the area in the case of the combining of the objects to the threshold value to determine whether or not the area is equal to or less than the threshold value. In general, if a large image is generated after the combining, a processing load of the combining is considerable. Accordingly, if the area after the combining exceeds the threshold value, the objects are not combined. If the area after the combining is equal to or less than the threshold value, it is determined that normal object combining is faster, and then the process proceeds to S604 of FIG. 6. Conversely, if the area after the combining exceeds the threshold value, it is determined that the combining of only the spooled objects is faster, and then the process returns to S604 of FIG. 6. Here, the normal combining of the objects includes the image combining and the path combining described above, but is not directly related to the gist of the present invention. Therefore, the description thereof will be omitted. In the present embodiment, a case in which the normal object combining is the image combining will be described.

In S604 of FIG. 6, the management unit 300 switches the process to be subsequently performed according to the determination result of S603. If the determination result of S603 is the case of "the spooled objects are combined," the process proceeds to S606. Otherwise, the object combining process ends and the process proceeds to S505 of FIG. 5.

The DL conversion unit 304 repeats the process of S606 until the spooled objects to be processed are gone. Here, the fact that the processing targets are the spooled objects herein means that the reception objects are not the combining targets. The reason is because the spooled objects and the reception objects in S603 and S604 differ in an optimum combining method, and therefore it is determined that the spooled objects and the reception objects should not to be combined simultaneously.

In S606, the DL conversion unit 304 converts the spooled objects into the DL. The DL has an intermediate data structure optimum for combining, and thus the objects can be combined quickly by converting the objects into the DL.

Figure 9:
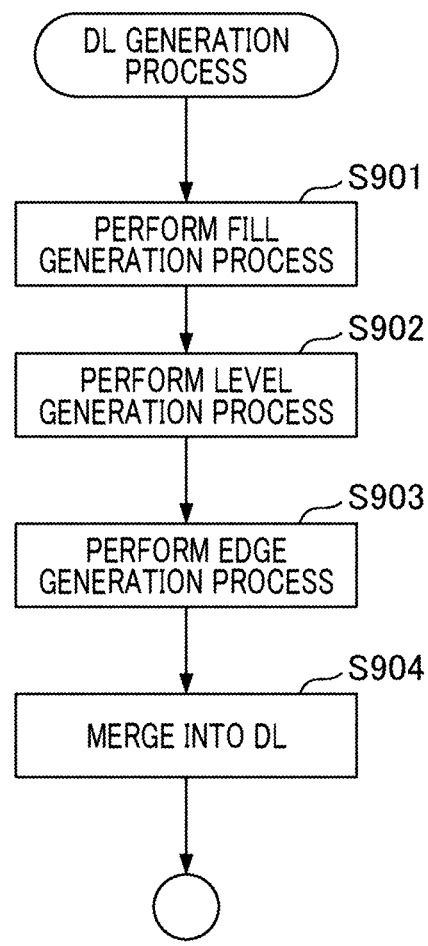
FIG. 9 is a flowchart illustrating an example of a DL generation process according to the present embodiment.

The details of the DL generation process are illustrated in the flowchart of FIG. 9. The process performed in S606 may be performed in advance in S602. In S605, if the spooled objects to be processed are gone, the process proceeds to S607. If the spooled objects to be processed are not gone, the process returns to S606.

Figure 10A:
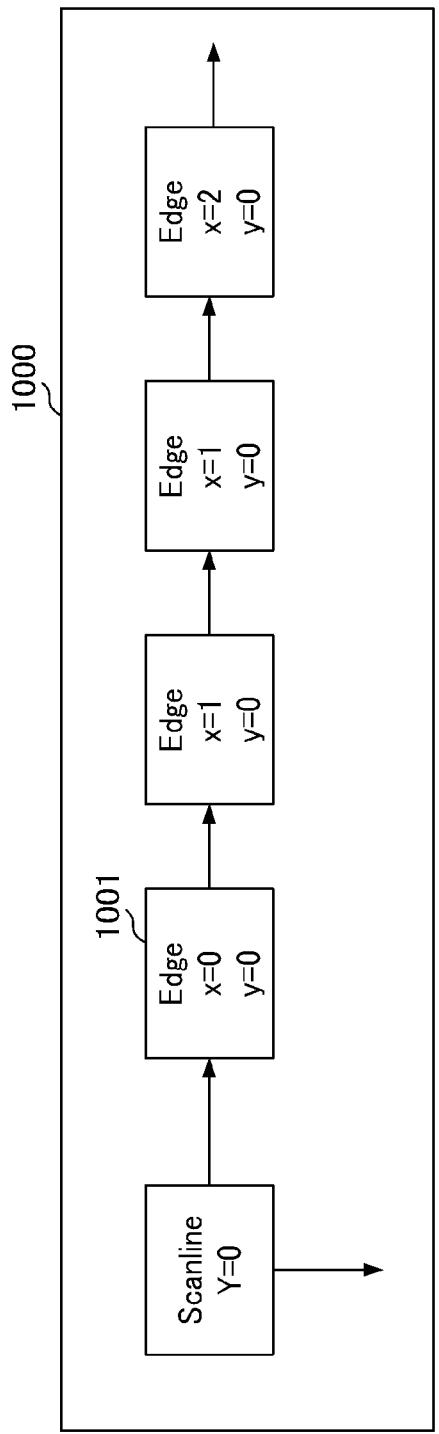
FIGS. 10A and 10B are diagrams illustrating an example of a configuration of a DL according to the present embodiment.
Figure 10B:
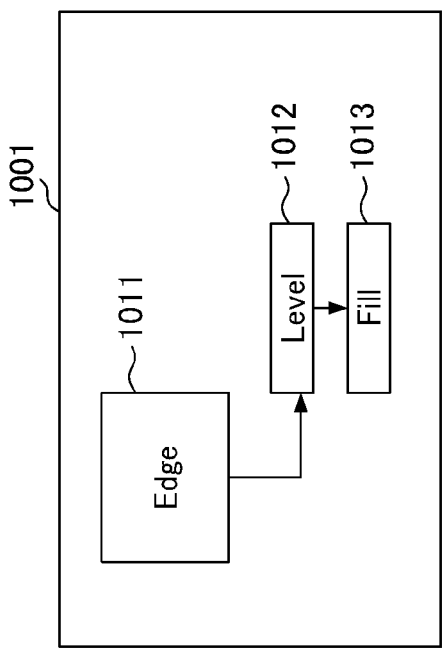

In FIG. 9, after a fill generation process, a level generation process, and an edge generation process are sequentially performed, a merging process is performed. Before each process is described, a structure of the DL generated in S606 will be described with reference to FIGS. 10A and 10B. A DL 1000 illustrated in FIG. 10A has a list structure in which coordinates of a starting point of an edge calculated from path shape information of the object are set as the axis. Here, a first direction is defined as an X direction and a second direction perpendicular to the X direction is defined as a Y direction. In the X direction, values of X are linked in an ascending order to edges on the same scanline (that is, the Y values are the same). In the Y direction, values of Y are linked in an ascending order to scanlines on which the starting point of the edge is present. The edge not only has information regarding the starting point but also level information maintaining a hierarchical relation between the edges and fill information maintaining color information. In FIGS. 10A and 10B, a state in which the objects in FIGS. 7A to 7D are registered in the DL 1000 is indicated by an edge list 1001. In the DL generation process, the DL conversion unit 304 generates the edge information, the level information, and the fill information from the objects and performs a process of merging (combining) these pieces of information into the DL.

In S901, the DL conversion unit 304 generates the fill information from the operand information regarding the objects. In a region of the fill information, information regarding a pattern or a color painted on the object is stored. Next, in S902, the DL conversion unit 304 generates the level information from operator information. The level information is information that expresses the objects arranged in a page by a Z order amount (a value in a Z direction perpendicular to the X and Y directions). For example, an object of level 1 indicates that the object is written above an object of level 0. In the level information, a level is decided in a processing order of the objects as a principle in consideration of ROP information included in the operator information. As illustrated in FIG. 10B, fill information 1013 generated in S901 is linked to level information 1012.

In S903, the DL conversion unit 304 generates the edge information from the path shape information. As illustrated in FIG. 10B, the level information 1012 generated in S902 is linked to edge information 1011. In this way, it is possible to acquire the edge information, the level information, and the fill information. That is, one edge list 1001 in the DL illustrated in FIG. 10B indicates a result obtained by linking the edge information 1011, the level information 1012, and the fill information 1013 as described above. Next, in S904, the DL conversion unit 304 performs a process of merging the edge information generated in S903 into the DL.

Figure 6:
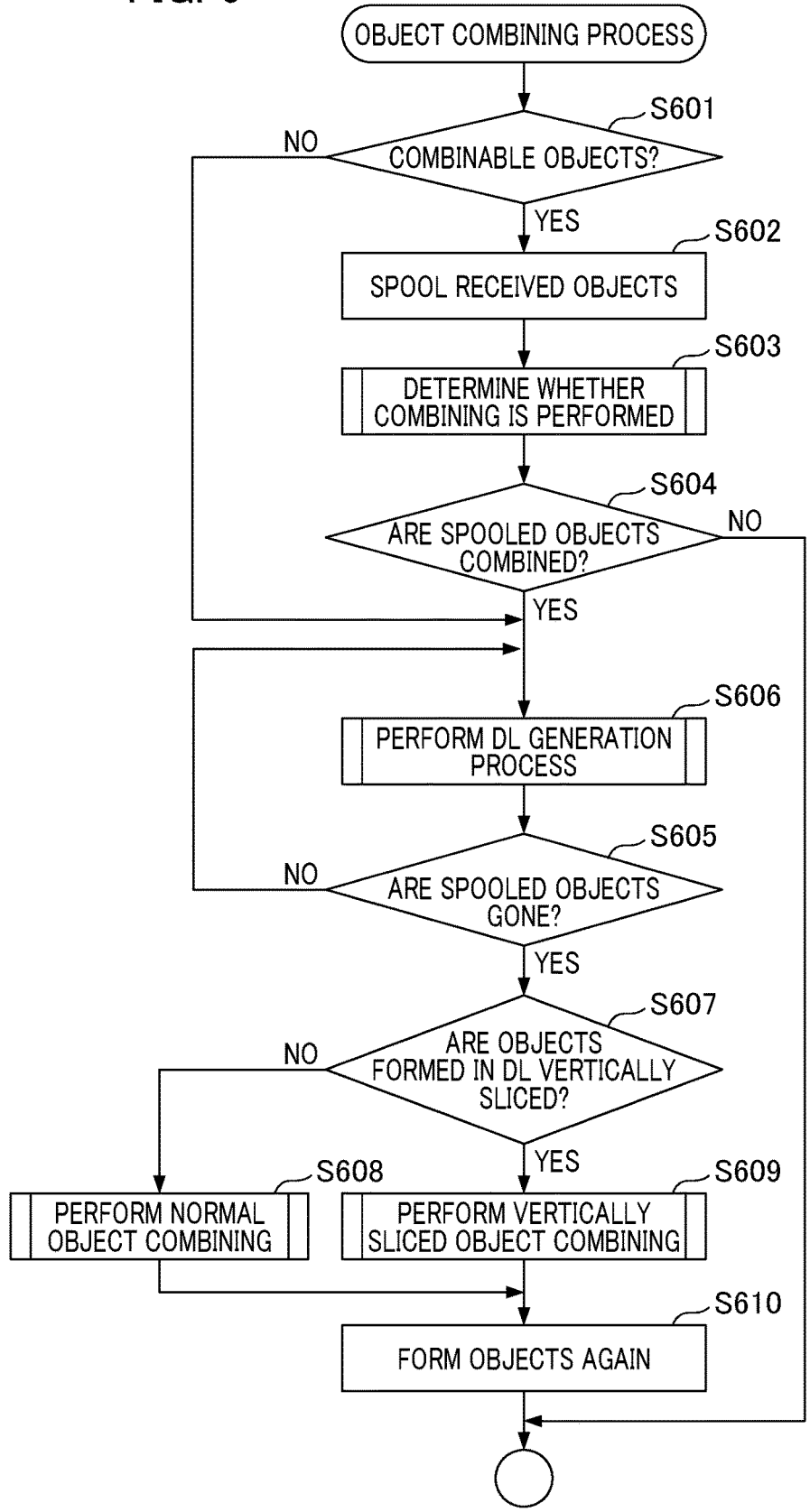
FIG. 6 is a flowchart illustrating an example of an object combining process according to the present embodiment.
Figure 7A:
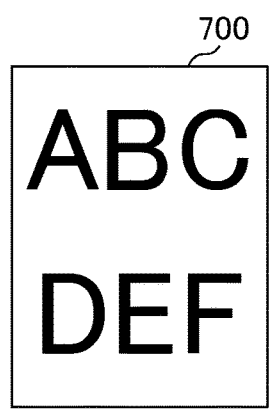
FIGS. 7A to 7D are diagrams illustrating a process of generating vertically sliced objects.
Figure 7B:
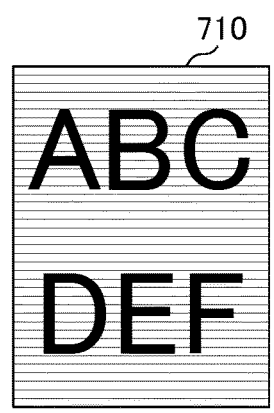
Figure 7C:
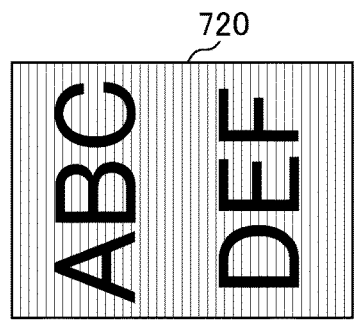
Figure 7D:
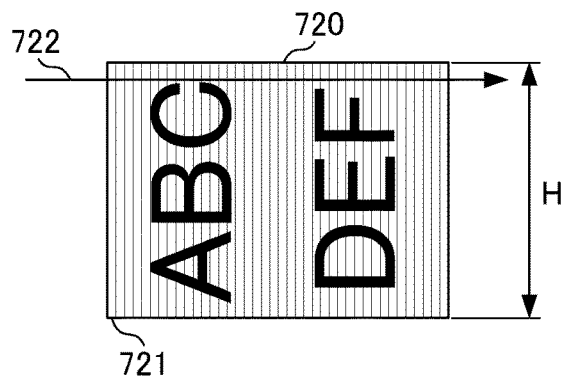

In S607 of FIG. 6, the management unit 300 switches the process according to a combining method optimum for an object group formed in the DL. The management unit 300 determines whether or not the objects formed in the DL in S606 are targets of the normal object combining or targets of the vertically sliced object combining. If the combining method is determined to be the normal object combining, the process proceeds to S608. If the combining method is determined to be the vertically sliced object combining, the process proceeds to S609.

In S608, the RIP processing unit 204 performs the normal object combining process based on the DL generated in S606. The details of this combining process will be described below with reference to FIG. 11. In S609, the RIP processing unit 204 performs the vertically sliced object combining process based on the DL generated in S606. The details of this combining process will be described below with reference to FIG. 12. After the process of S608 or S609, the management unit 300 performs a process of forming the combined images as objects again in S610. Through this process, the plurality of combined objects can be processed as one object.

Figure 13A:
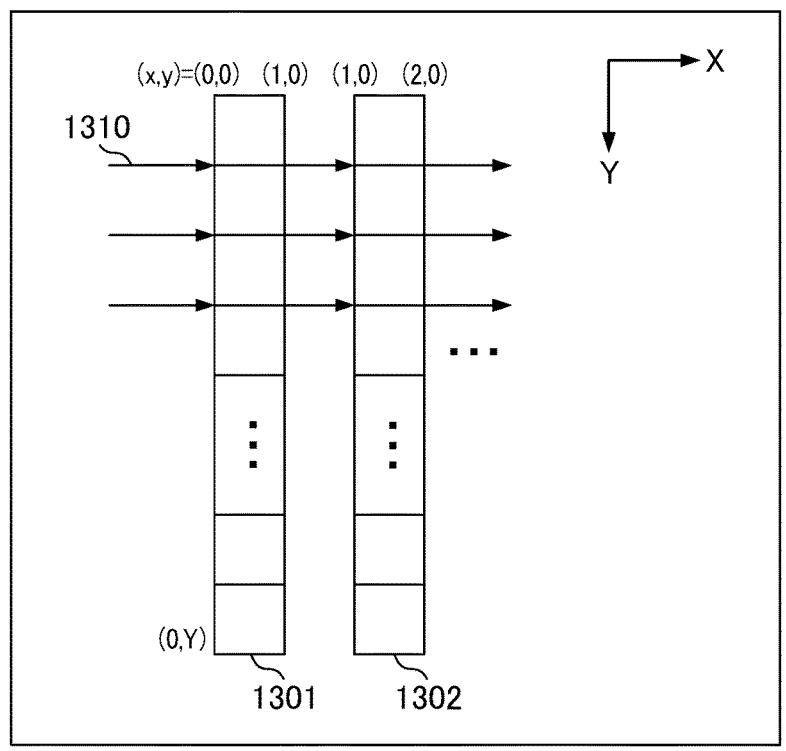
FIGS. 13A and 13B are schematic diagrams illustrating a process of combining according to the present embodiment.

Next, the normal object combining process of S608 of FIG. 6 will be described with reference to FIGS. 11 and 13A. First, a structure of the DL 1000 combined in S608 of FIG. 6 will be described with reference to FIG. 13A. FIG. 13A is a diagram schematically illustrating the structure of the DL 1000 combined in S608 of FIG. 6. The horizontal direction (see the direction of an arrow 1310) is defined as an X direction, a vertical direction perpendicular to the X direction is defined as a Y direction, and coordinates on an XY plane are indicated as (x, y). In a normal rendering process, as illustrated in FIG. 13A, pixels are scanned for each scanline in the X direction (each horizontal line) and information regarding intersecting edges is read so that colors to be output to the pixels are decided. Herein, a case in which the objects of the printing job 720 in FIGS. 7A to 7D are combined will be described for comparison to the vertically sliced object combining to be described below. In the present embodiment, however, since the optimum combining method in S603 of FIG. 6 is determined to be the vertically sliced object combining, the normal object combining is not actually performed. To facilitate the description, although a space is provided between objects 1301 and objects 1302 so that a space is shown, such a space is not actually present. An image is assumed to be a memory space of 1 bit/pixel.

Figure 11:
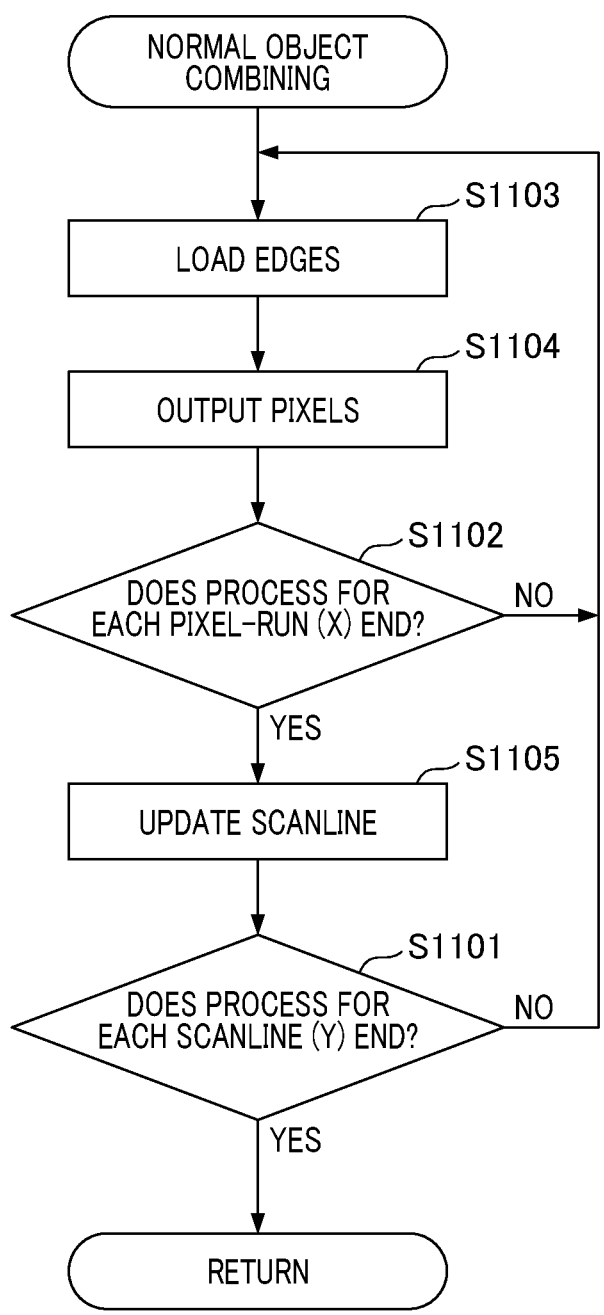
FIG. 11 is a flowchart illustrating a normal object combining example according to the present embodiment.

The RIP processing unit 204 in FIG. 11 repeats processes from S1103 to S1105 for each scanline arranged in the Y direction. In the case of the DL 1000 exemplified in FIG. 10A, the RIP processing unit 204 processes the pixels on a scanline Y=y. If such a process is completed, the repetition process is performed so that the pixels on a subsequent scanline Y=y1 are processed.

The RIP processing unit 204 repeats processes of S1103 and S1104 on processing target scanlines. The RIP processing unit 204 decides a color of each pixel by scanning edges in the X direction. In S1103, the RIP processing unit 204 loads the edges. The pieces of loaded information are the edge information, the level information, and the fill information. In S1104, the RIP processing unit 204 decides a value by which a pixel is painted from the fill information loaded in S1103. For example, if the fill information is an image, the RIP processing unit 204 acquires image binaries from the fill information, calculates and acquires a value by which the pixel is painted, and outputs the value as a pixel value.

In S1102, if the process for each pixel-run (X) (that is, for a processing target horizontal line) ends, the process proceeds to S1105. That is, if outputting pixels corresponding to one scanline is completed through the processes from S1102 to S1104, the process proceeds to S1105. On the other hand, if the process for each pixel-run (X) does not end, the process returns to S1103. In S1105, the RIP processing unit 204 updates a subsequent scanline. In S1101, if the process for each scanline (Y) (that is, for each horizontal line) ends, the process ends. If the process for each scanline (Y) does not end, the process returns to S1103. Through the above-described processes, the spooled objects can be scanline-rendered in the X direction as illustrated in FIG. 13A.

Unlike the present embodiment, a case in which the normal object combining is performed on the object group determined as vertically sliced objects will be described. In this case, it is necessary to load an edge for each pixel, read image binaries, and acquire pixel values to be output from the image binaries. As a result, the processing load increases. Further, it is considerably inefficient to access different image binaries for each pixel from the viewpoint of cache efficiency. Accordingly, in the present embodiment, a vertically sliced object combining process to be described below is performed on the object group determined as the vertically sliced objects. That is, in S609 of FIG. 6, the RIP processing unit 204 performs the vertically sliced object combining process based on the DL generated in S606. This combining process will be described with reference to FIGS. 12 and 13B.

Figure 13B:
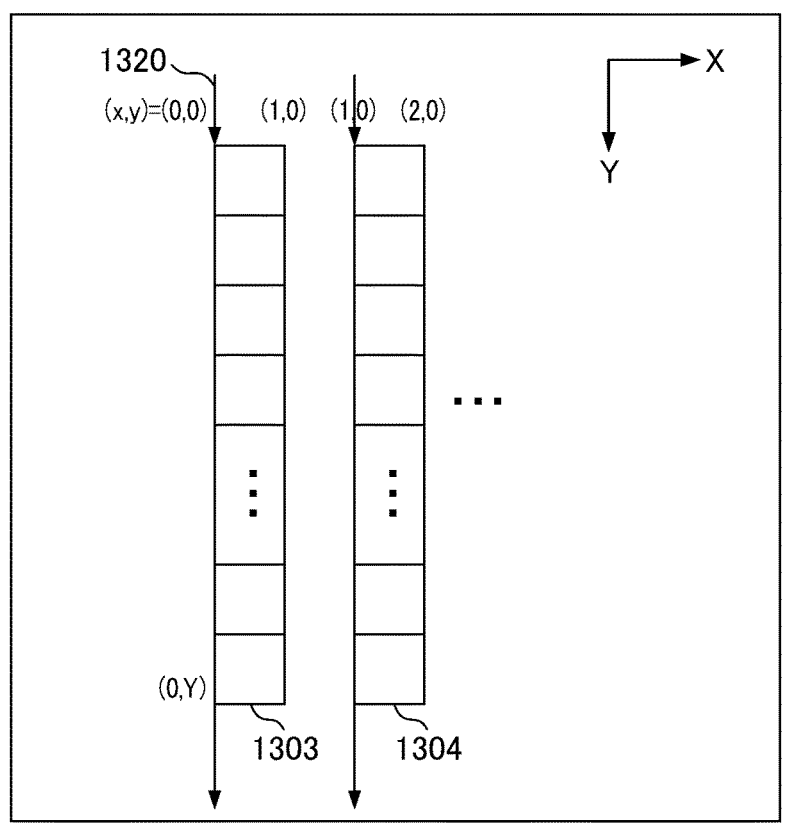

First, the structure of the DL 1000 combined in S609 of FIG. 6 will be described with reference to FIG. 13B. In FIG. 13B, a vertical direction (see the direction of an arrow 1320) is defined as a Y direction, the horizontal direction perpendicular to the Y direction is defined as an X direction, coordinates on an XY plane are indicated by (x, y). In a rendering process, as illustrated in FIG. 13B, pixels are scanned for each scanline in the vertical direction (the Y direction) and information regarding intersecting edges is read so that colors to be output to the pixels are decided. To facilitate the description, although a space is provided between objects 1303 and objects 1304 so that a space is shown, such a space is not actually present. An image is assumed to be a memory space of 1 bit/pixel.

Figure 12:
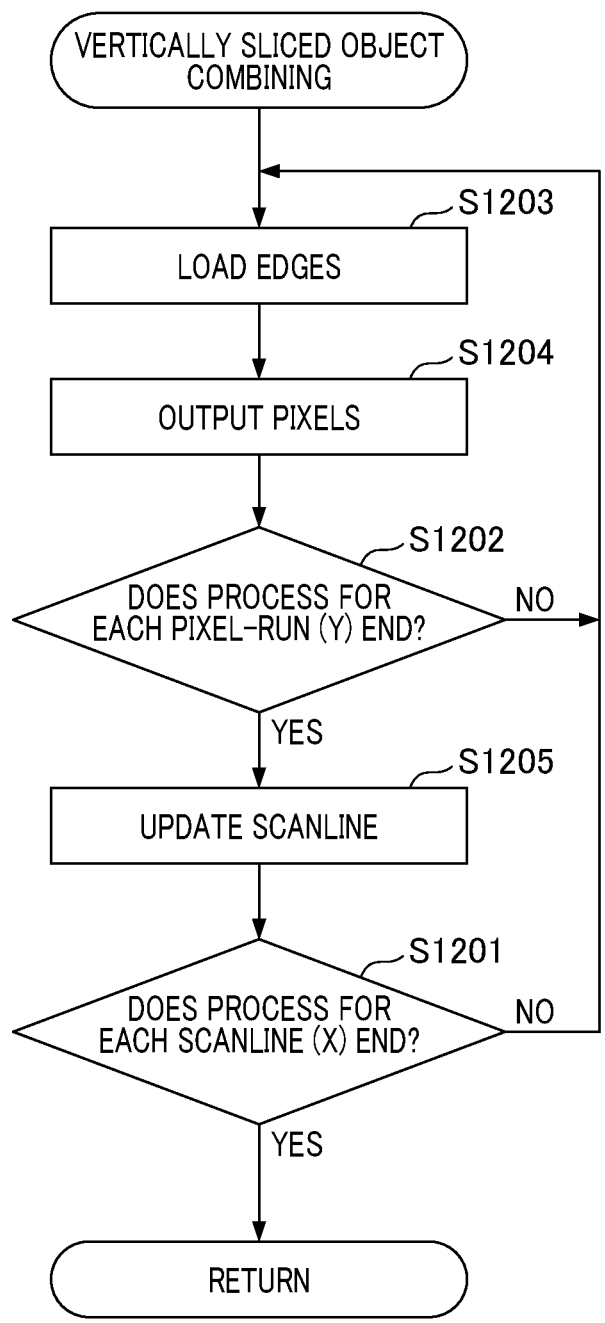
FIG. 12 is a flowchart illustrating an example of vertically sliced object combining according to the present embodiment.

The RIP processing unit 204 in FIG. 12 repeats processes from S1203 to S1205 for each scanline (each vertical line) arranged in the X direction. For DL 1000 related to scanlines indicated by the arrow 1320 in the Y direction illustrated in FIG. 13B, the RIP processing unit 204 processes the plurality of pixels on a longitudinal scanline X=0. If the RIP processing unit 204 completes such a process, the RIP processing unit 204 performs the repetition process so that the pixels on a subsequent longitudinal line X=1 are processed.

The RIP processing unit 204 repeats processes of S1203 and S1204 on processing target lines. The RIP processing unit 204 decides a color of each pixel by scanning edges in the Y direction. In S1203, the RIP processing unit 204 loads the edges. The pieces of loaded information are the edge information, the level information, and the fill information. In the line indicated by the arrow 1320 in FIG. 13B, the process of loading the edge information having an image with a width of 1 and a height H at (x, y)=(0, 0) is performed. In S1204, the RIP processing unit 204 decides a value by which the pixel is painted from the fill information associated with the edge information loaded in S1203. For example, the RIP processing unit 204 outputs a first bit of a beginning of the image binaries as a pixel value at the time of outputting of the pixel value of (x, y)=(0, 0) in the processing target line (see the arrow 1320).

A pixel value of the target line on X=0 is output by repeating the processes of S1203 and S1204. That is, the RIP processing unit 204 outputs a second bit of the image binary as a pixel value in a subsequent pixel (0, 1) on the target line. Further, the RIP processing unit 204 develops the consecutive image binaries as pixel values in the Y direction if a third bit is output as a pixel value in a subsequent pixel (0, 2).

In S1202, if the process for each pixel-run (Y) (that is, for a processing target vertical line) ends, the process proceeds to S1205. That is, if outputting of pixels corresponding to one line in the Y direction is completed through the processes from S1202 to S1204, the process proceeds to S1205. In S1205, the RIP processing unit 204 updates a subsequent scanline. In S1201, if the process for each scanline (X) (that is, for each vertical line) ends, the process ends. If the process for each scanline (X) does not end, the process returns to S1203. In the case of the objects 721 in FIGS. 7A to 7D, the loading process for the edge information starting from a subsequent edge (1, 0) is performed and the pixels are output in the Y direction, as described in S1202 to S1204. Through the above-described processes, the spooled objects can be scanline-rendered in the Y direction illustrated in FIG. 13B.

As described the above, in the present embodiment, the vertically sliced object combining is performed on the object group determined to be vertically sliced objects. In this way, the number of edge loadings which is a cause of an increase in the processing load in the normal object combining can be reduced from 2N*H times to 2N times. For access to the image binary, data of continuous regions can be read from a memory to a cache storage device in units of several words and a process can be efficiently performed using the data. Accordingly, it is possible to improve cache efficiency.

According to the present embodiment, it is determined whether or not objects are vertically sliced objects according to information which the objects have. By spooling the objects according to the determination result, it is possible to collectively combine the vertically sliced objects. Since the vertically sliced object combining process is performed on the vertically sliced objects at the time of the combining the objects, it is possible to realize the combining faster than if the normal object combining process is performed on the vertically sliced objects.

In the present embodiment, objects having a width of 1 in relation to printing data which are processing targets have been exemplified in the description, but the advantages can be obtained even if objects of which a width is not 1 are combined. This method will be described with reference to FIG. 14. In processes illustrated in FIGS. 14, S1401 and S1402 are added to the processes described in FIG. 9. Therefore, the description of the processes from steps S901 to S904 will be omitted, and differences will be described.

In S1401, the DL conversion unit 304 determines whether or not reception objects satisfy three conditions below:

(1) the reception objects are processing targets of the vertically sliced object combining;

(2) the reception objects are image objects (the fill information is an image); and (3) the reception objects are objects in which a width of an image is within a threshold value.

If all of the three conditions are satisfied, the process proceeds to S1402. If any of the three conditions is not satisfied, the process proceeds to S901 to perform the processes from S901 to S904. A case in which an image has 1 bit/pixel and memory access is a 4-byte access of the CPU 101 is assumed. For example, the threshold used for the condition determination of (3) is assumed to be greater than 1 and less than 32 and it is whether or not the objects are objects having a width which is within this range is determined. The reason why the lower limit is set to 1 is that if the width of an image is greater than 1, addresses of image binaries are discontinuous in reading at the time of combining the vertically sliced objects. The reason why the upper limit is set to 32 is that if the width of an image is equal to or greater than 32, cache efficiency is high even in the normal object combining, and therefore a difference between the advantages of the normal object combining and the vertically sliced object combining is small. The threshold value is appropriately changed according to an image gray scale or an architecture to be mounted.

Figure 15:
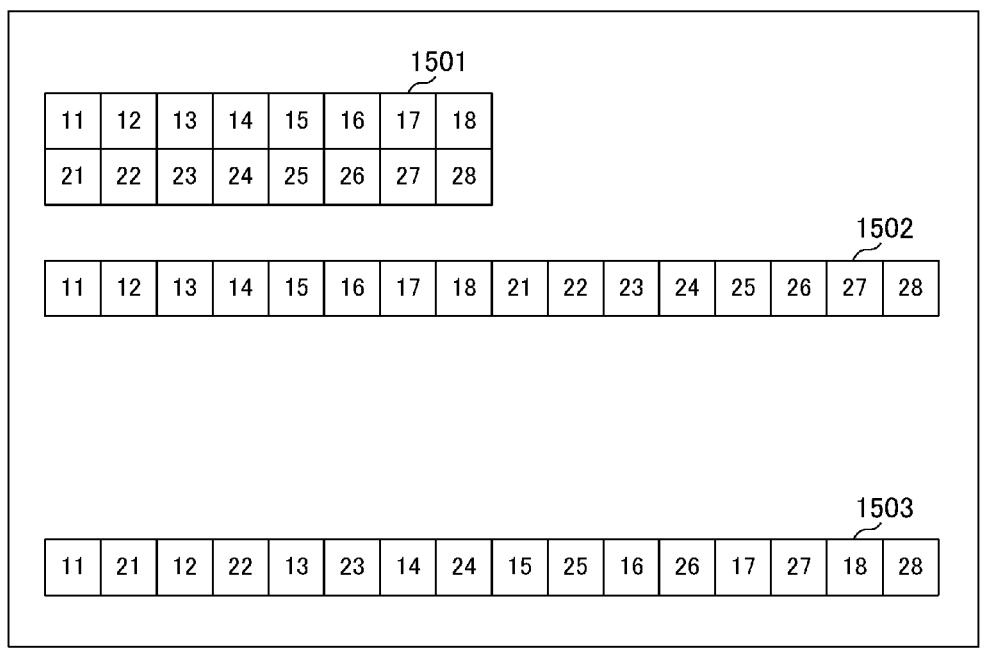
FIG. 15 is an explanatory diagram illustrating a process of S1402 illustrated in FIG. 14.

In S1402, the DL conversion unit 304 changes disposition of the image binaries so that the image binaries set in the reception objects are continuous in the longitudinal direction (the Y direction). This process will be described with reference to FIG. 15. For example, in the case of an image 1501 in which a width is 8 and a height is 2, image binaries 1502 are disposed in one row. In the image 1501, 11 to 18 are arranged in the X direction and 21 to 28 are arranged in a next row (the Y direction). In the image binaries 1502, 11 to 18 are arranged and 21 to 28 follow. In S1402, a process of rearranging a disposition of the image binaries 1502 is performed as in image binaries 1503. That is, since the continuity in the longitudinal direction (the Y direction) in the image binaries 1503 is maintained, for example, 21 continues after 11 and 12 and 22 further continue in the arrangement. After the process of S1402, the processes from S901 to S904 are performed.

Figure 14:
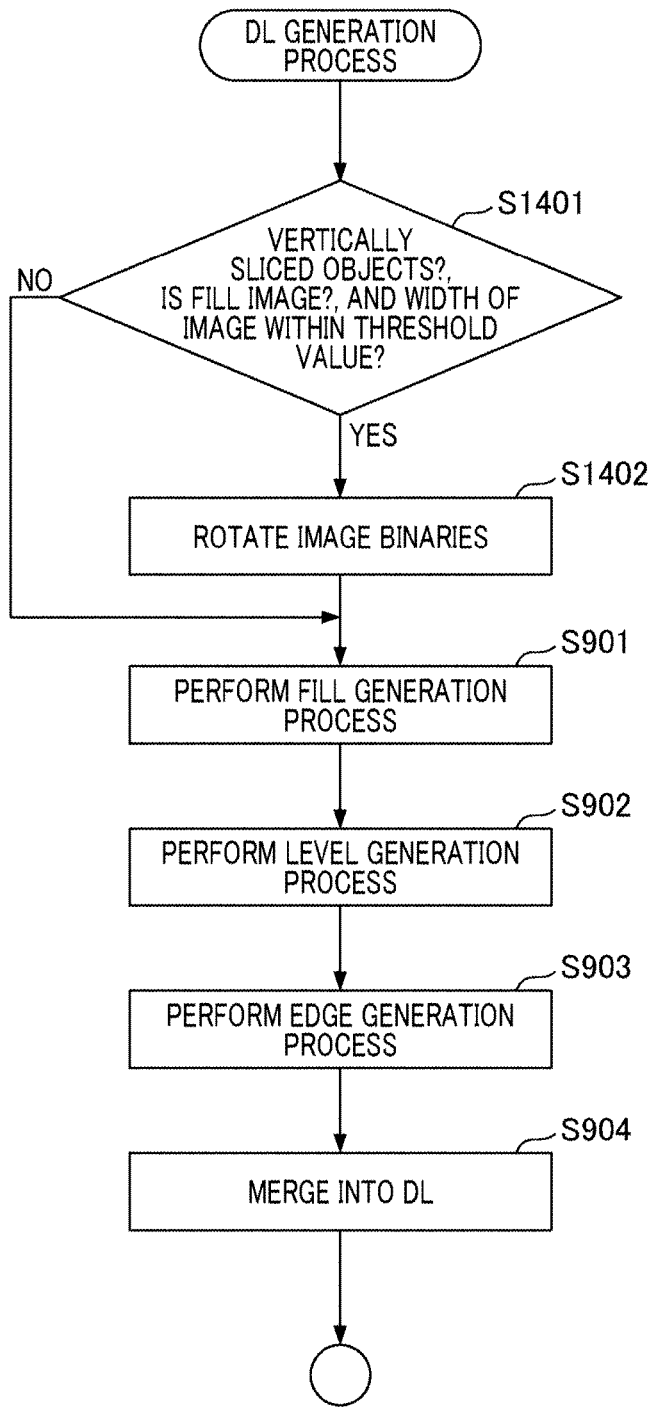
FIG. 14 is a flowchart illustrating an example of a DL generation process if the width of an object is greater than 1.

In the processes described in FIG. 14, the image binaries can be continuously output at the time of the vertically sliced object combining in S609 of FIG. 6 even for the vertically sliced objects of which the width is not 1. Accordingly, it is possible to reduce the processing load applied to the vertically sliced object combining. This method is effective in a case of a configuration in which hardware particularly specialized for rotation of an image is mounted.

In the above-described embodiment, if the image data is processed with the scanline method and the rendering process is performed, the vertically sliced objects are determined and combined, and then are collectively rendered in the longitudinal direction. In this way, the edge processing amount per scanline decreases and the same image is accessed, and therefore the cache efficiency is improved. Accordingly, it is possible to speed up the rendering speed.In the foregoing embodiment, the case in which the operand information serving as an example of the vertically sliced object is an image has been described. However, even in the case of a flat fill, the number of times the edges are loaded is decreases. Therefore, it is possible to obtain the same advantages. In this case, in 5804 of FIG. 8, the combining determination unit 301 determines whether or not the operand information regarding the reception objects and the spooled objects is all flat fill, and performs a branching process. In this way, it is possible to obtain the same advantages as the foregoing embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-072844, filed Mar. 31, 2015 which is hereby incorporated by reference wherein in its entirety.

What is claimed is:

1. An image processing apparatus that performs a rasterization process with a scanline method, the apparatus comprising:
   a processor; and
   a memory, the processor and the memory configured to function as:
      a generation unit configured to generate a first plurality of objects from a printing job, the first plurality of objects including vertically sliced objects;
      a spool unit configured to spool a second plurality of objects;
      a determination unit configured to determine whether or not one of the first plurality of objects is one of the vertically sliced objects to be combined with one of the second plurality of objects;
      a combination unit configured to render each of the vertically sliced objects and each of the second plurality of objects in a vertical direction perpendicular to a scanline direction in the scanline method, based on the determination, in order to form a plurality of combined objects; and
      a rasterization unit configured to rasterize a page based on at least the plurality of combined objects with the scanline method,
   wherein each of the vertically sliced objects has a height and a width, the height being greater than the width and the width being a size along the scanline direction in the scanline method.

2. The image processing apparatus according to claim 1, wherein the combination unit changes image binaries set in each of the first plurality of objects so that the image binaries are disposed to continue in the vertical direction if the determination unit determines that each of the first plurality of objects is one of the vertically sliced objects and the width of each of the first plurality of objects is less than a threshold value.

3. The image processing apparatus according to claim 1, the processor and the memory further configured to function as a combining determination unit configured to compare pieces of operand information between the first plurality of objects and the second plurality of objects and determine that the first plurality of objects and the second plurality of objects are combinable if the pieces of operand information are the same between the first plurality of objects and the second plurality of objects.

4. The image processing apparatus according to claim 3, wherein the combining determination unit determines that one of the first plurality of objects and one of the second plurality of objects are combinable if the pieces of operand information are different between the one of the first plurality of objects and the one of the second plurality of objects and one of the pieces of operand information of the one of the first plurality of objects is an image and one of the pieces of operand information of the one of the second plurality of objects is a flat fill.

5. The image processing apparatus according to claim 3, wherein the combining determination unit determines that one of the first plurality of objects is combinable with one of the second plurality of objects if an area ratio of:
   (i) a first area, in a case where the one of the first plurality of objects is combined with the one of the second plurality of objects spooled by the spool unit, to
   (ii) a second area, in a case where the one of the first plurality of objects is not combined with the one of the second plurality of objects spooled by the spool unit,
   is equal to or less than a threshold value.

6. The image processing apparatus according to claim 5, wherein the combining determination unit determines that the one of the first plurality of objects is combinable as one of the vertically sliced objects with the one of the second plurality of objects if a width of the one of the first plurality of objects is less than a threshold width value and a ratio of a height to the width of the one of the first plurality of objects is equal to or greater than a threshold ratio value.

7. The image processing apparatus according to claim 1, further comprising:
   a printer configured to print an image of the rasterized page.

8. An image processing method including a rasterization process with a scanline method, the image processing method comprising:
   generating a first plurality of objects from a printing job, the first plurality of objects including vertically sliced objects;
   spooling a second plurality of objects;
   determining whether or not one of the first plurality of objects is one of the vertically sliced objects to be combined with one of the second plurality of objects;
   rendering each of the vertically sliced objects and the one of the second plurality of objects in a vertical direction perpendicular to a scanline direction in the scanline method, based on the determination, in order to form a plurality of combined objects; and
   rasterizing a page based on at least the plurality of combined objects with the scanline method,
   wherein each of the vertically sliced objects has a height and a width, the height being greater than the width and the width being a size along the scanline direction in the scanline method.

9. The image processing method according to claim 8, further comprising:
   printing an image of the rasterized page.

10. A non-transitory computer-readable storage medium storing a computer program causing a computer to perform an image processing method performed in an image processing apparatus, the image processing method including a rendering process with a scanline method, the image processing method comprising:

generating a first plurality of objects from a printing job, the first plurality of objects including vertically sliced objects;

spooling a second plurality of objects;

determining whether or not one of the first plurality of objects is one of the vertically sliced objects to be combined with one of the second plurality of objects;

rendering each of the vertically sliced objects and the one of the second plurality of objects in a vertical direction perpendicular to a scanline direction in the scanline method, based on the determination, in order to form a plurality of combined objects; and rasterizing a page based on at least the plurality of combined objects with the scanline method, wherein each of the vertically sliced objects has a height and a width, the height being greater than the width and the width being a size along the scanline direction in the scanline method.

\* \* \* \* \*